US010147420B2

(12) United States Patent
Shima (10) Patent No.: US 10,147,420 B2
(45) Date of Patent: *Dec. 4, 2018

(54) TERMINAL, UNLOCKING METHOD, AND PROGRAM (71) Applicant: NEC Corporation, Minato-ku, Tokyo (JP)

(72) Inventor: Yoshikazu Shima, Kawasaki (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/006,992

(22) Filed: Jun. 13, 2018

(65) Prior Publication Data
US 2018/0293975 A1 Oct. 11, 2018

Related U.S. Application Data (63) Continuation of application No. 14/758,290, filed as application No. PCT/JP2014/050180 on Jan. 9, 2014.

(30) Foreign Application Priority Data

Jan. 10, 2013 (JP) .................... 2013-002387

(51) Int. Cl.
G10L 15/22 (2006.01)
G10L 15/26 (2006.01)
(Continued)

(52) U.S. Cl.
CPC .............. *G10L 15/07* (2013.01); *G06F 3/167* (2013.01); *G06F 21/32* (2013.01);
(Continued)

(58) Field of Classification Search
CPC ....... G10L 15/22; G10L 15/265; G10L 15/30; G10L 17/005; G06F 3/0481; H04W 12/06; H04W 12/424; H04W 19/04
See application file for complete search history.

(56) References Cited

U.S. PATENT DOCUMENTS 5,940,799 A * 8/1999 Bruckert ................. G06F 21/32
379/88.01
6,145,083 A * 11/2000 Shaffer ................... G06F 21/31
455/410
(Continued)

FOREIGN PATENT DOCUMENTS

CN 101742603 A 6/2010
CN 102004906 A 4/2011
(Continued)

OTHER PUBLICATIONS

Kocera Corp., "au DIGNO S", Online, Oct., 2012, Internet<URL:http://www.kyocera.co.jp/prdct/telecom/consumer/ky121/catalog/pdf/dignos_catalog.pdf>, cited in ISR.
(Continued)

*Primary Examiner* — Anne L Thomas-Homescu (57) ABSTRACT

A terminal comprises: a speech receiving unit that receives speech in a locked state; a voiceprint authentication unit that performs voiceprint authentication based on the speech received in the locked state and determining whether or not a user is legitimate; a speech recognition unit that performs speech recognition of the speech received in the locked state; and an execution unit that executes an application using a result of the speech recognition.

12 Claims, 6 Drawing Sheets (51) Int. Cl.
  *G10L 15/30* (2013.01)
  *G06F 3/0481* (2013.01)
  *H04W 12/06* (2009.01)
  *H04W 4/24* (2018.01)
  *G10L 15/07* (2013.01)
  *G06F 21/32* (2013.01)
  *G06F 3/16* (2006.01)
  *G07C 9/00* (2006.01)
  *G10L 17/00* (2013.01)
  *G10L 17/22* (2013.01)

(52) U.S. Cl.
  CPC .......... *G07C 9/00087* (2013.01); *G10L 17/00* (2013.01); *G10L 17/22* (2013.01); *G10L 2015/223* (2013.01)

(56) References Cited

U.S. PATENT DOCUMENTS

| | | | | |
|---|---|---|---|---|
| 6,404,859 B1 * | 6/2002 | Hasan | G10L 15/30 | 379/88.04 |
| 6,527,638 B1 * | 3/2003 | Walker | G07F 17/32 | 463/25 |
| 7,167,543 B2 * | 1/2007 | Bennett | H04M 11/04 | 379/37 |
| 7,522,060 B1 * | 4/2009 | Tumperi | G06Q 10/06 | 340/5.82 |
| 8,140,340 B2 * | 3/2012 | Bhogal | G10L 17/00 | 704/273 |
| 8,312,660 B1 | 11/2012 | Fujisaki | | |
| 8,543,397 B1 * | 9/2013 | Nguyen | G06F 3/04883 | 704/235 |
| 8,543,834 B1 * | 9/2013 | Barra | G06F 21/32 | 713/182 |
| 8,639,214 B1 * | 1/2014 | Fujisaki | G06Q 20/32 | 379/88.03 |
| 8,676,273 B1 * | 3/2014 | Fujisaki | H04M 1/6505 | 455/567 |
| 8,717,285 B1 * | 5/2014 | White | G06F 3/0346 | 345/156 |
| 8,950,990 B2 | 2/2015 | Dooner | | |
| 8,959,360 B1 * | 2/2015 | Barra | G06F 21/32 | 455/411 |
| 9,063,629 B2 * | 6/2015 | Newman | G06F 3/048 | |
| 9,076,008 B1 * | 7/2015 | Moy | G06F 21/60 | |
| 9,154,931 B2 * | 10/2015 | Diamond | H04M 1/72541 | |
| 2001/0041982 A1 * | 11/2001 | Kawasaki | G10L 15/26 | 704/275 |
| 2002/0126054 A1 * | 9/2002 | Fuerst | B60C 23/0444 | 343/712 |
| 2003/0122652 A1 * | 7/2003 | Himmelstein | B60R 25/257 | 340/5.81 |
| 2005/0132420 A1 * | 6/2005 | Howard | G06F 3/017 | 725/135 |
| 2005/0193188 A1 * | 9/2005 | Huang | G06F 9/4406 | 713/1 |
| 2005/0275505 A1 * | 12/2005 | Himmelstein | G10L 17/22 | 340/5.8 |
| 2006/0106605 A1 * | 5/2006 | Saunders | G10L 17/04 | 704/246 |
| 2006/0206381 A1 * | 9/2006 | Frayman | G06Q 10/10 | 705/14.52 |
| 2007/0198262 A1 * | 8/2007 | Mindlin | G10L 17/02 | 704/246 |
| 2007/0245882 A1 * | 10/2007 | Odenwald | G06F 17/3074 | 84/609 |
| 2008/0082339 A1 * | 4/2008 | Li | A61B 5/14551 | 704/275 |
| 2008/0112567 A1 * | 5/2008 | Siegel | H04R 1/10 | 381/58 |
| 2008/0256613 A1 * | 10/2008 | Grover | G06F 21/32 | 726/5 |
| 2008/0299948 A1 * | 12/2008 | Rosener | H04M 1/6066 | 455/412.2 |
| 2009/0096596 A1 * | 4/2009 | Sultan | G07C 5/008 | 340/426.13 |
| 2009/0164938 A1 * | 6/2009 | Wang | G06F 1/1601 | 715/803 |
| 2009/0205041 A1 * | 8/2009 | Michalske | H04W 4/90 | 726/17 |
| 2009/0325546 A1 * | 12/2009 | Reddy | H04B 1/3833 | 455/414.1 |
| 2009/0328169 A1 * | 12/2009 | Hutchison | G06F 21/41 | 726/7 |
| 2010/0091953 A1 * | 4/2010 | Kim | H04M 3/385 | 379/88.02 |
| 2010/0106502 A1 * | 4/2010 | Farrell | G07C 9/00158 | 704/246 |
| 2010/0106503 A1 * | 4/2010 | Farrell | G10L 17/04 | 704/246 |
| 2010/0145709 A1 * | 6/2010 | Kumar | G10L 15/30 | 704/273 |
| 2010/0216429 A1 * | 8/2010 | Mahajan | G06F 21/6245 | 455/411 |
| 2010/0257490 A1 * | 10/2010 | Lyon | G06F 3/0488 | 715/863 |
| 2011/0275348 A1 * | 11/2011 | Clark | G06F 21/32 | 455/411 |
| 2012/0005735 A1 * | 1/2012 | Prasanna | H04L 9/321 | 726/7 |
| 2012/0009896 A1 * | 1/2012 | Bandyopadhyay | G06F 1/1643 | 455/411 |
| 2012/0166365 A1 * | 6/2012 | Tur | G06N 5/022 | 706/11 |
| 2012/0179471 A1 * | 7/2012 | Newman | G10L 15/30 | 704/270.1 |
| 2012/0245941 A1 * | 9/2012 | Cheyer | G06F 21/32 | 704/246 |
| 2012/0249328 A1 * | 10/2012 | Xiong | G10L 15/22 | 340/541 |
| 2012/0252411 A1 * | 10/2012 | Johnsgard | G07C 9/00158 | 455/411 |
| 2012/0284297 A1 * | 11/2012 | Aguera-Arcas | G06F 3/03547 | 707/769 |
| 2012/0293642 A1 * | 11/2012 | Berini | G06F 21/32 | 348/77 |
| 2013/0073293 A1 * | 3/2013 | Jang | G10L 15/22 | 704/275 |
| 2013/0111581 A1 * | 5/2013 | Griffin | G06F 21/31 | 726/19 |
| 2013/0160110 A1 * | 6/2013 | Schechter | G06F 21/629 | 726/19 |
| 2013/0179219 A1 * | 7/2013 | Ross | G06Q 30/0202 | 705/7.31 |
| 2013/0205312 A1 * | 8/2013 | Huang | H04N 21/482 | 725/11 |
| 2013/0238326 A1 * | 9/2013 | Kim | G06F 3/167 | 704/231 |
| 2013/0268272 A1 * | 10/2013 | Zhang | G10L 17/00 | 704/243 |
| 2013/0282588 A1 * | 10/2013 | Hruska | G06Q 20/10 | 705/67 |
| 2013/0297319 A1 * | 11/2013 | Kim | G10L 15/22 | 704/275 |
| 2013/0298208 A1 * | 11/2013 | Ayed | G06F 21/00 | 726/6 |
| 2013/0322634 A1 * | 12/2013 | Bennett | G10L 21/00 | 381/17 |
| 2013/0325484 A1 * | 12/2013 | Chakladar | G06F 3/167 | 704/275 |
| 2013/0332165 A1 * | 12/2013 | Beckley | G10L 17/04 | 704/246 |
| 2013/0339018 A1 * | 12/2013 | Scheffer | G10L 17/22 | 704/236 |
| 2013/0339240 A1 * | 12/2013 | Anderson | G06Q 20/40 | 705/44 |
| 2014/0095173 A1 * | 4/2014 | Lynch | G10L 15/22 | 704/275 |

(56) References Cited

U.S. PATENT DOCUMENTS

| | | | |
|---|---|---|---|
| 2014/0108010 A1* | 4/2014 | Maltseff | G06F 3/167 |
| | | | 704/235 |
| 2014/0109210 A1* | 4/2014 | Borzycki | A63F 13/213 |
| | | | 726/7 |
| 2014/0162612 A1* | 6/2014 | Ma | H04M 3/42042 |
| | | | 455/414.1 |
| 2014/0219746 A1* | 8/2014 | Dooner | B60B 3/165 |
| | | | 411/429 |
| 2014/0320391 A1* | 10/2014 | Bazaz | H04W 52/0277 |
| | | | 345/156 |
| 2017/0249116 A1* | 8/2017 | Chang | H04W 76/10 |
| 2017/0286027 A1* | 10/2017 | Chang | H04W 76/10 |

FOREIGN PATENT DOCUMENTS

| | | |
|---|---|---|
| CN | 102647521 A | 8/2012 |
| JP | 2000-099076 A | 4/2000 |
| JP | 2000-224663 A | 8/2000 |
| JP | 2002-236666 A | 8/2002 |
| JP | 2002-312318 A | 10/2002 |
| JP | 2003-345390 A | 12/2003 |
| JP | 2004-180254 A | 6/2004 |
| JP | 2007-140048 A | 6/2007 |
| JP | 2011-049885 A | 3/2011 |
| JP | 2011-087110 A | 4/2011 |
| JP | 2011-114698 A | 6/2011 |

OTHER PUBLICATIONS

Kocera Corp., "au KYL21 DIGNO S 4G LTE Toriatsukai Setsumeisho Shosaiban", Online, Oct. 2012, pp. 31, 41, 113, 150 to 151,1st edition, Internet<URL:http://media.kddi.com/app/publish/torisetsu/pdf/ky121_torisetsu_shousai.pdf>, cited in ISR.

Suzumari, "'DIGNO S KYL21' Kaihatsusha Interview Daiyoryo Battery to 'Sugu' ni Kodawatta Sosasei", Online, Nov. 2012, Impress Watch Corp., Internet<URL:http://k-tai. impress.co.jp/docs/interview/20121113_571709.html>, cited in ISR.

International Search Report for PCT Application No. PCT/JP2014/050180, dated Apr. 15, 2014.

Chinese Office Action for CN Application No. 201480004395.0 dated Dec. 12, 2016 with English Translation.

Japanese Office Action for JP Application No. 2014-556426 dated Feb. 14, 2017 with English Translation.

* cited by examiner

TERMINAL, UNLOCKING METHOD, AND PROGRAM

CROSS-REFERENCE TO RELATED APPLICATIONS

The present application is a continuation application of U.S. patent application Ser. No. 14/758,290 filed on Jun. 29, 2015, which is a National Stage Entry of International Application PCT/JP2014/050180, filed on Jan. 9, 2014, which claims the benefit of priority from Japanese Patent Application 2013-002387 filed on Jan. 10, 2013, the disclosures of all of which are incorporated in their entirety by reference herein.

TECHNICAL FIELD

Cross-Reference to Related Applications

The present application claims priority from Japanese Patent Application No. 2013-002387 (filed on Jan. 10, 2013), the content of which is hereby incorporated in its entirety by reference into this specification. The invention relates to a terminal, an unlocking method, and a program, and in particular to a terminal provided with voiceprint authentication and speech recognition functions, and an unlocking method and program for the terminal.

BACKGROUND

In recent years, mobile terminals such as smart phones, tablet terminals and the like are rapidly becoming widely used. As a method of inputting to these mobile terminals, a method of operating a touch panel by a finger is generally used. On the other hand, in order to enable input to a terminal when both hands are full, model types that have a function for terminal operation by speech input are increasing.

In a mobile terminal provided with a touch panel, in order to avoid misuse, when the terminal is started up for the first time or is activated from a sleep state, an authentication screen is displayed and a confirmation is made as to whether or not the user is legitimate. Known methods of performing authentication and releasing usage restrictions include a method based on password input, or a method based on the locus of a finger on a touch panel, or the like.

In a case where a mobile terminal is inside a bag or a pocket, it is necessary to avoid a malfunction being caused by an unintended reaction of the touch panel. Therefore, a method is used wherein a particular operation that does not occur frequently on the touch panel is recommended to a user, and usage restrictions of the terminal are unlocked only in a case where the particular operation is accepted. The particular operation, for example, may be an operation of sliding a finger only a fixed distance on the screen, or an operation such as a double tap of a particular region.

Releasing usage restrictions on a terminal (that is, access restrictions to information or resources held by the terminal) based on user input to an authentication screen, a particular operation by the user, or the like, is referred to below as "unlocking."

As related technology, Patent Literature 1 discloses an individual authentication device that uses biometric information such as fingerprint, voiceprint, face, or iris.

Patent Literature 2 discloses a method of unlocking a mobile telephone based on a result of comparing a stored user voiceprint and speech uttered by a user.

Patent Literature 3 discloses a speech recognition system in which an individual is authenticated based on voiceprint information extracted from inputted speech, and when authenticated speech is determined, commands from the speech in question are recognized, and a device is remotely operated by the recognized commands.

Patent Literature 4 discloses a mobile terminal device in which voiceprint authentication is performed based on speech generated by a user, and depending on the authentication result, prescribed processing is executed or halted in accordance with the speech.

PTL 1:
Japanese Patent Kokai Publication No. JP2002-236666A
PTL 2:
Japanese Patent Kokai Publication No. JP2004-180254A
PTL 3:
Japanese Patent Kokai Publication No. JP2007-140048A
PTL 4:
Japanese Patent Kokai Publication No. JP2011-087110A

SUMMARY

The entire disclosed content of the abovementioned patent literature is incorporated herein by reference thereto. The following analysis is given according to the present inventor.

Normally, to display an authentication screen in order to perform unlocking, it is necessary to perform startup or activation from a sleep state. In performing activation from a sleep state based on an operation on a software key or a touch panel, sensing of the touch panel has to be continuously performed, which is not preferable from the viewpoint of power consumption. Therefore, in activation from a sleep state, generally an operation on a hardware key is necessary, and the unlocking is performed by user input to an authentication screen displayed by the relevant operation. This series of operations is troublesome for a user who wishes to use functions of the terminal immediately.

Patent Literature 1 discloses an individual authentication device that uses a voiceprint as biometric information. According to this device, it is not necessary for the user to perform an operation by a finger. Furthermore, an unlocking method is known whereby a registered fixed phrase read out by the user himself is the password. However, there is a risk that the security level will drop due to another person hearing the fixed phrase being read.

In order to overcome the technical problem described in Patent Literature 1, it is possible to use, for example, an unlocking method using voiceprint authentication described in Patent Literature 2. However, since it is easier to perform an input operation to a screen by a finger than to expressly make an utterance for the purpose of unlocking a smart phone or tablet, there is a problem in that user convenience is not improved.

On the other hand, smart phones and tablet terminals that have a speech recognition function, such as conversation-type terminal operations and speech input search, are becoming popular. However, in using a speech recognition function in these terminals, as described above, it is necessary to perform startup by an operation on a hardware key, to perform unlocking based on input to an authentication screen, and in addition, to perform selection of an icon for speech input from a menu, with the result that operability is poor.

According to technology described in Patent Literature 3 and 4, a terminal in a locked state is not capable of speech reception; a user cannot immediately use a function of the terminal in a locked state; and a cumbersome operation is required in order to unlock the terminal.

Therefore, there is a demand to be able to easily unlock a terminal having voiceprint authentication and speech recognition functions.

According a first aspect of the present invention, there is provided a terminal, comprising: a speech receiving unit that receives speech in a locked state; a voiceprint authentication unit that performs voiceprint authentication based on the speech received in the locked state and determining whether or not a user is legitimate; a speech recognition unit that performs speech recognition of the speech received in the locked state; and an execution unit that executes an application using a result of the speech recognition.

According a second aspect of the present invention, there is provided an unlocking method, comprising: by a terminal, receiving speech in a locked state; performing voiceprint authentication based on the speech received in the locked state and determining whether or not a user is legitimate; performing speech recognition of the speech received in the locked state; and executing an application using a result of the speech recognition.

According a third aspect of the present invention, there is provided a program, causing a computer provided in a terminal to execute: receiving speech in a locked state; performing voiceprint authentication based on the speech received in the locked state and determining whether or not a user is legitimate; performing speech recognition of the speech received in the locked state; and executing an application using a result of the speech recognition. It is to be noted that this program may be provided as a program product recorded on a non-transitory computer-readable storage medium.

The present invention provides the following advantage, but not restricted thereto. According to the terminal, the unlocking method, and the program, in accordance with the present invention, it is possible to easily unlock a terminal provided with voiceprint authentication and speech recognition functions.

PREFERRED MODES

In the present disclosure, there are various possible modes, which include the following, but not restricted thereto. First, a description is given concerning an outline of an exemplary embodiment. It is to be noted that reference symbols in the drawings attached to this outline are examples for the purpose of aiding understanding, and are not intended to limit the present invention to modes illustrated in the drawings.

Figure 1:
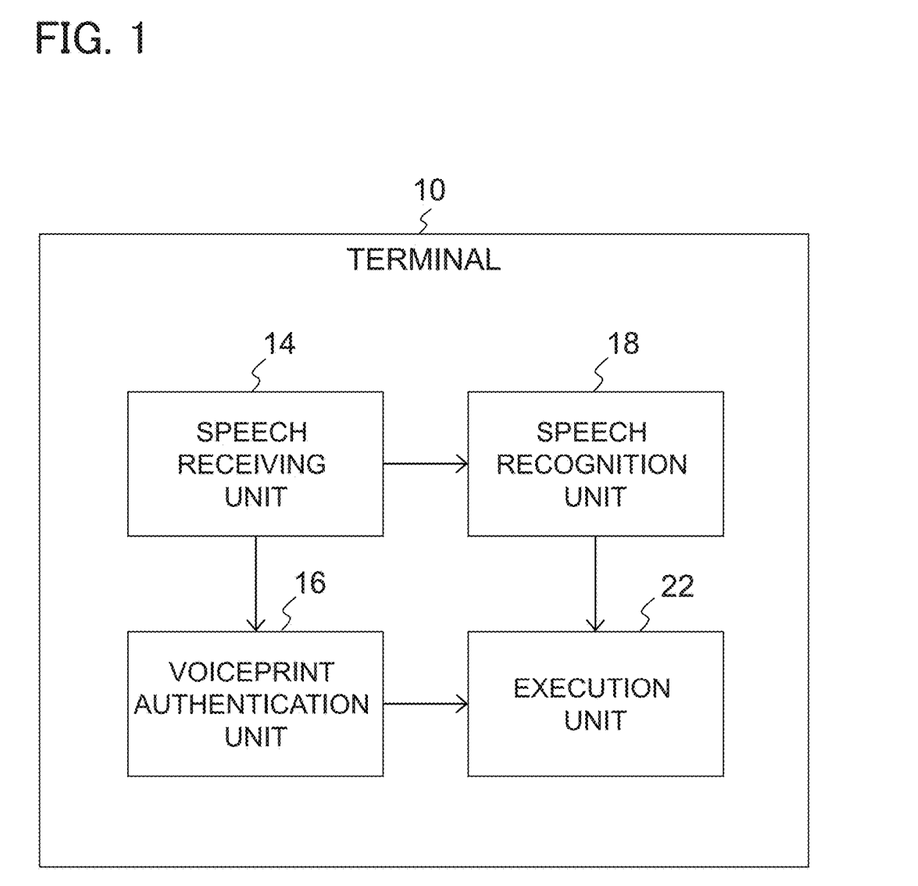
FIG. 1 is a block diagram showing an example of a configuration of a terminal according to a first exemplary embodiment.

Referring to FIG. 1, a terminal (10) is provided with: a speech receiving unit (14) that receives speech with the terminal (10) in a locked state; a voiceprint authentication unit (16) that performs voiceprint authentication based on the speech received in the locked state and determining whether or not the user is legitimate; a speech recognition unit (18) that performs speech recognition (for example, converting the speech into text data) of the speech received in the locked state; and an execution unit (22) that executes an application using a result of the speech recognition (for example, text data).

With the terminal (10), by uttering the content of text (for example, a command, a keyword, or the like) for executing an application, a terminal user can unlock the terminal and execute the application. Therefore, the user of the terminal (10) need not make an utterance for the purpose only of unlocking the terminal. Consequently, with the terminal (10), it is possible to easily unlock a terminal having voiceprint authentication and speech recognition functions.

Figure 3:
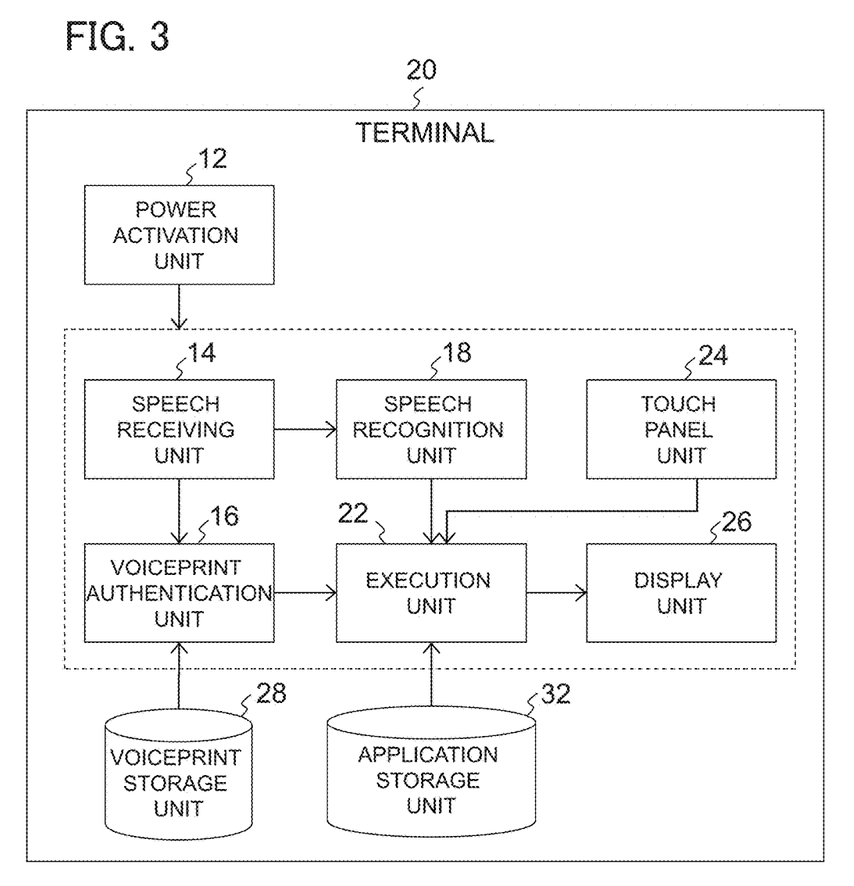
FIG. 3 is a block diagram showing an example of a configuration of a terminal according to a second exemplary embodiment.

Referring to FIG. 3, a terminal (20) may be further provided with a power activation unit (12) that activates a power supply to the terminal (20) if a prescribed operation is detected. At this time, the speech receiving unit (14) begins receiving the speech in a locked state if the power supply to the terminal (20) is activated in response to the prescribed operation.

According to the terminal (20) in question, with the terminal in a locked state, there is no necessity to continuously run a speech receiving operation by the speech receiving unit (14), and it is possible to start the speech receiving operation by the speech receiving unit (14) with an operation on the power activation unit (12) as a trigger. Therefore, according to the terminal (20), it is possible to reduce power consumption in the locked state.

Figure 5:
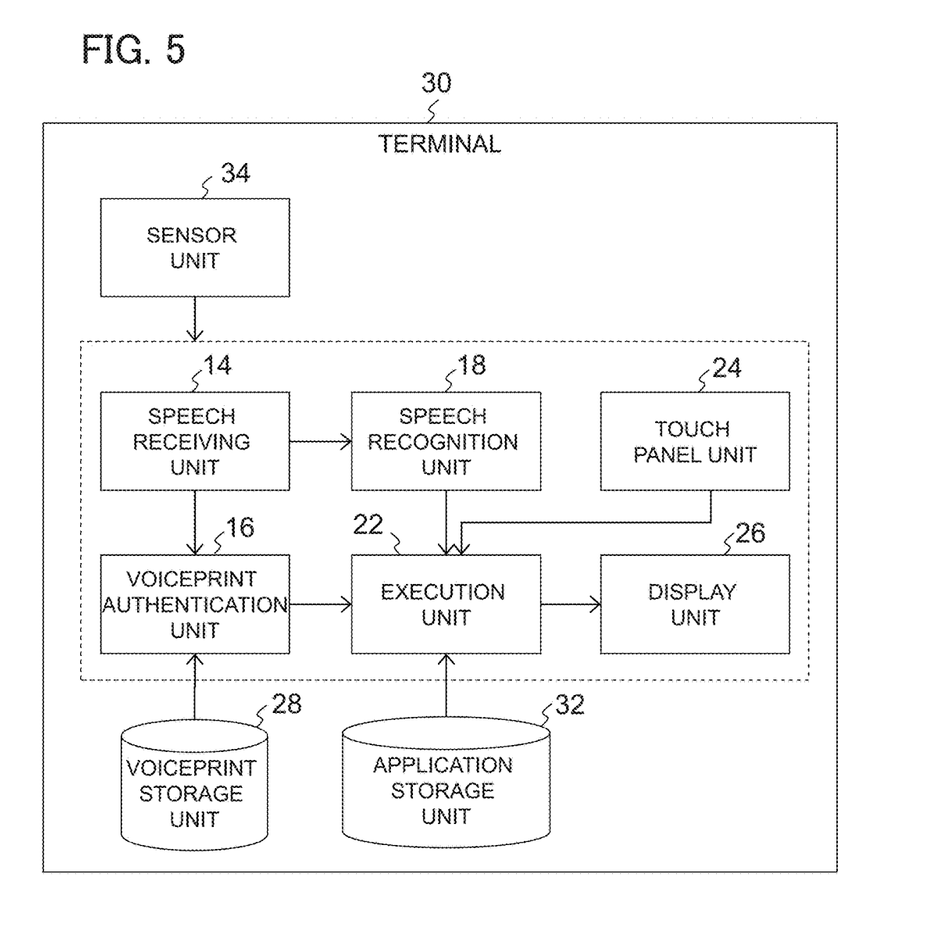
FIG. 5 is a block diagram showing an example of a configuration of a terminal according to third and fourth exemplary embodiments.

Referring to FIG. 5, a terminal (30) may be provided with a sensor unit (34) that measures a prescribed physical amount. At this time, the speech receiving unit (14) begins receiving speech in the locked state if the physical amount (for example, vibration, heat) measured by the sensor unit (34) is a prescribed value.

According to the terminal (30) in question, with the terminal in a locked state, there is no necessity to continuously run a speech receiving operation by the speech receiving unit (14), and it is possible to start the speech receiving operation by the speech receiving unit (14) with measurement of a prescribed physical amount by the sensor unit (34) as a trigger. According to the terminal (30), by making the sensor unit (34) operate with lower power consumption than the speech receiving unit (14), it is possible to reduce power consumption in the locked state.

If the voiceprint authentication determines that the user is legitimate, the execution unit (22) may execute an application using the result of the speech recognition, while allowing access to protected information stored in the terminal (10). On the other hand, if the voiceprint authentication does not determine that the user is legitimate, the execution unit (22) may execute an application using the result of the speech recognition, while forbidding access to protected information stored in the terminal (10).

According to the terminal (10) in question, even in a case where it is not recognized by voiceprint authentication that the user is legitimate, it is possible to execute an application based on speech uttered by the user, while appropriately protecting information stored in the terminal (10). Therefore, according to the terminal (10), in a case of failure in recognizing by voiceprint authentication that the user is legitimate, it is possible to avoid a wasted utterance by the user.

A detailed description is given below concerning the terminal according to exemplary embodiments, making reference to the drawings. It is to be noted that the terminal is not limited to a mobile telephone, smart phone etc., but may also be another electronic device such as a game console, a tablet terminal, a notebook PC (Personal Computer), a personal data assistant (PDA), a digital camera, a digital video camera, or the like. Applications operating using result(s) (for example, text data) of the speech recognition are not limited to applications such as speech recognition search (for example, web search), voice calls and the like, and may be other applications (for example, car navigation software, music reproduction software and the like) based on a speech recognition function. In the following exemplary embodiments a description is given of a case where a result of speech recognition is text data, but the result of the speech recognition is not limited to text data.

First Exemplary Embodiment

A description is given concerning a terminal according to a first exemplary embodiment, making reference to the drawings. FIG. 1 is a block diagram showing an example of a configuration of the terminal according to the present exemplary embodiment. Referring to FIG. 1, the terminal 10 is provided with a speech receiving unit 14, a voiceprint authentication unit 16, a speech recognition unit 18, and an execution unit 22.

The speech receiving unit 14 receives speech with the terminal 10 in a locked state. The voiceprint authentication unit 16 performs voiceprint authentication based on the speech received in the locked state and determines whether or not the user is legitimate. The speech recognition unit 18 converts the speech received in the locked state to text data by speech recognition. The execution unit 22 executes an application using the text data.

Figure 2:
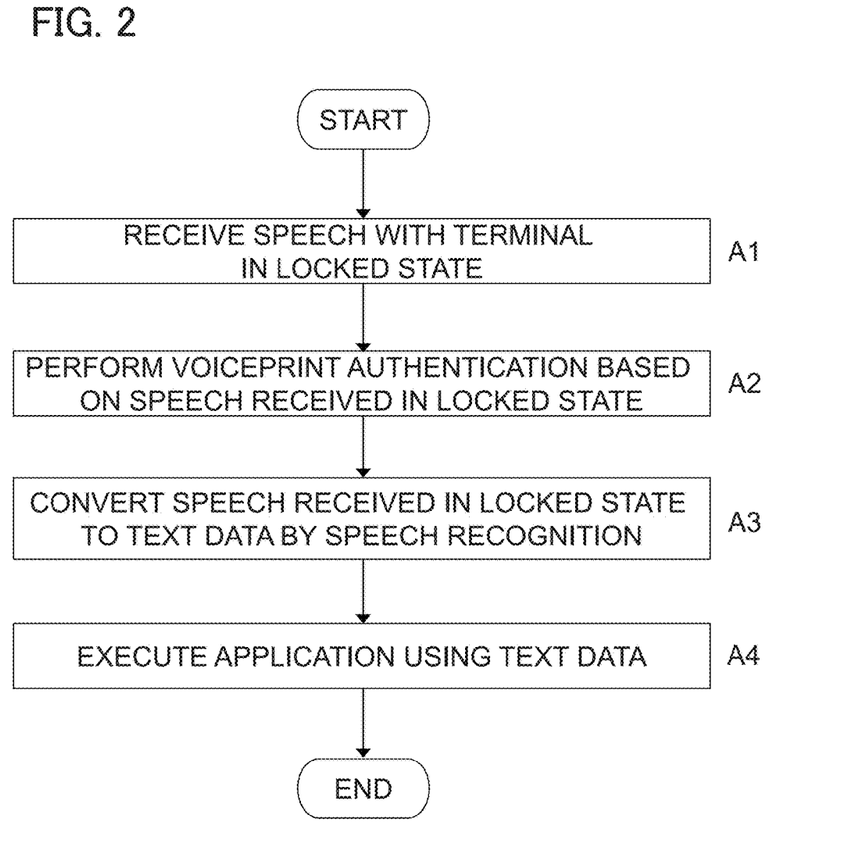
FIG. 2 is a block diagram showing an example of operations of the terminal according to the first exemplary embodiment.

FIG. 2 is a block diagram showing an example of operations of the terminal 10 according to the present exemplary embodiment. Referring to FIG. 2, a description is given concerning operations of the terminal 10.

First, the speech receiving unit 14 receives speech with the terminal 10 in a locked state (step A1).

Next, the voiceprint authentication unit 16 performs voiceprint authentication based on the speech received in the locked state and determines whether or not the user is legitimate (step A2). The speech recognition unit 18 converts the speech received in the locked state to text data by speech recognition (step A3). It is to be noted that the order of the voiceprint authentication and the speech recognition is not limited to the order shown in FIG. 2. Furthermore, the voiceprint authentication and the speech recognition may be executed at the same time.

Next, the execution unit 22 executes an application using the text data (step A4).

According to the terminal 10, by uttering text so as to execute an application, a user of the terminal 10 can unlock the terminal 10 and execute the application. Therefore, the user of the terminal need not make an utterance for the purpose only of unlocking the terminal. Consequently, according to the terminal 10, it is possible to easily unlock a terminal having voiceprint authentication and speech recognition functions.

Second Exemplary Embodiment

A description is given concerning a terminal according to a second exemplary embodiment, making reference to the drawings. FIG. 3 is a block diagram showing an example of a configuration of the terminal according to the present exemplary embodiment. Referring to FIG. 3, the terminal 20 is provided with a power activation unit 12, a speech receiving unit 14, a voiceprint authentication unit 16, a speech recognition unit 18, an execution unit 22, a touch panel unit 24, a display unit 26, a voiceprint storage unit 28, and an application storage unit 32.

The voiceprint storage unit 28 is provided in advance with voiceprint information of a user of the terminal 20, in order to perform voiceprint authentication.

The application storage unit 32 holds an application that operates using text data (for example, a command, a keyword, or the like) extracted from speech by a speech recognition function, or an application activated based on the text data in question. As an application (also referred to simply as "app"), a voice search application that performs web search and the like based on a search keyword given by a user, a voice call application that makes a call based on a telephone number of another party given by the user, or the like, may be envisaged. However, applications are not limited to thereto.

The power activation unit 12 activates a power supply to the terminal 20 when a prescribed operation, such as a hardware key being pressed by the user, is detected.

The speech receiving unit 14 receives speech with the terminal 20 in a locked state. The speech receiving unit 14 begins receiving the speech in a locked state, in a case where the power supply to the terminal 20 is activated in response to the abovementioned prescribed operation.

The voiceprint authentication unit compares the speech received in the locked state and the voiceprint information stored in the voiceprint storage unit 28 to perform voiceprint authentication, and determines whether or not the user is legitimate.

The speech recognition unit 18 converts the speech received in the locked state to text data by speech recognition.

The execution unit 22 uses the text data obtained by the speech recognition unit 18 to execute (or start up) an application stored in the application storage unit 32.

In a case of determining by voiceprint authentication that the user is legitimate, the execution unit 22 executes an application using the text data obtained by the speech recognition, while allowing access to protected information stored in the terminal 20. For example, in a case where the application is a voice search application, when it is recognized that the user of the terminal 20 is legitimate, the execution unit 22 may perform a search using cookie information stored in the terminal 20. On the other hand, in a case where it is not determined by voiceprint authentication that the user is legitimate, the execution unit 22 executes an application using the text data, while forbidding access to protected information stored in the terminal 20.

It is to be noted that in a case where an application cannot be executed without using protected information stored in the terminal 20, when it is not determined by voiceprint authentication that the user is legitimate, the execution unit 22 need not execute or start up an application.

In a case of determining by voiceprint authentication that the user is legitimate, the execution unit 22 extracts applications related to word(s) included in the text data and displays the extracted application list on the display unit 26 of the terminal 20.

The touch panel unit 24 receives input based on a touch operation by the user. It is to be noted that the touch panel unit 24 and the display unit 26 may have a configuration where they are mutually superimposed (for example, stuck together).

Figure 4:
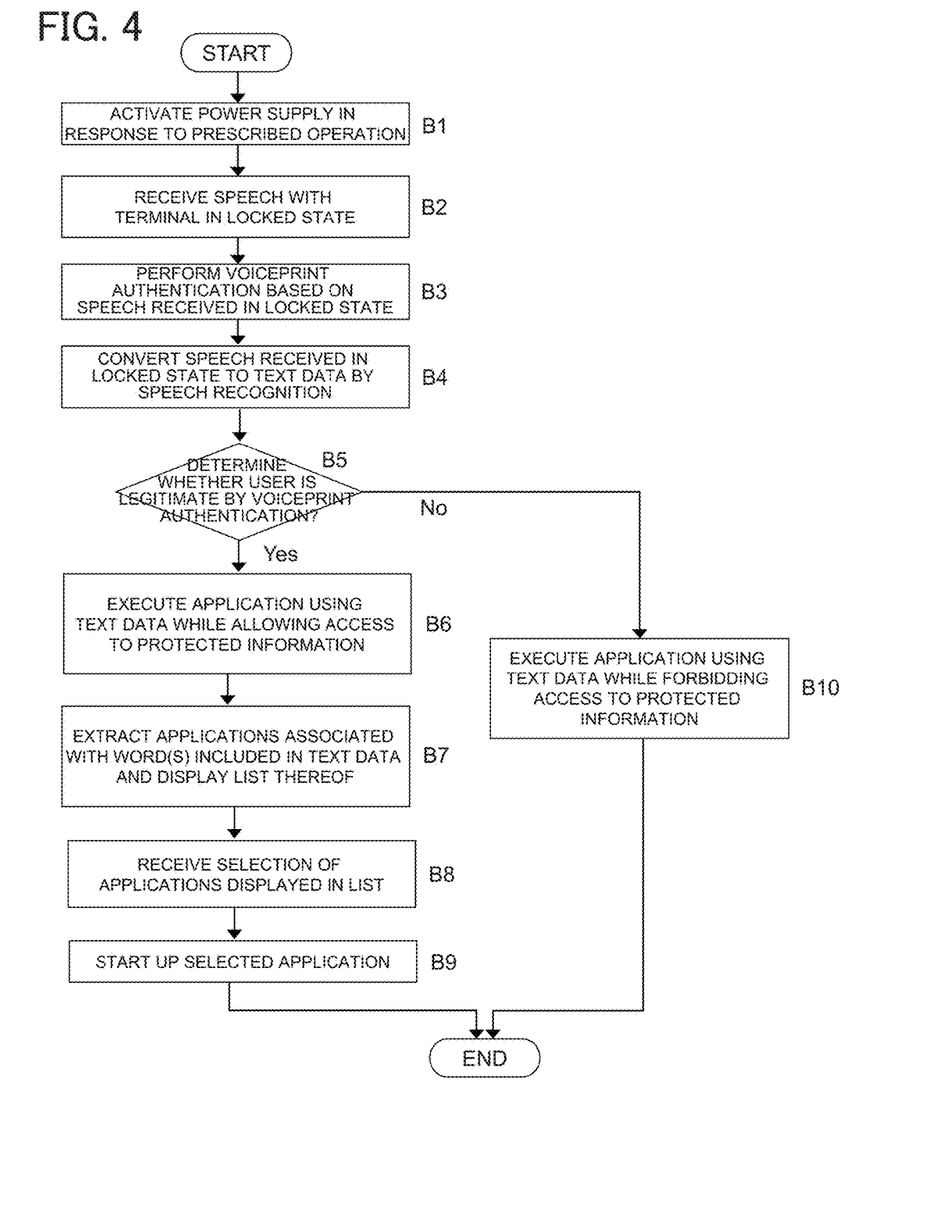
FIG. 4 is a block diagram showing an example of operations of the terminal according to the second exemplary embodiment.

FIG. 4 is a block diagram showing an example of operations of the terminal 20 (FIG. 3). Referring to FIG. 4, a description is given concerning operations of the terminal 20.

In order to enable operation of the terminal 20 that is in a sleep state, for example, when the user gives a short push to a power button or the like, the power activation unit 12 activates the power supply to the terminal 20 (step B1). Then the speech receiving unit 14 starts receiving speech in the locked state (step B2).

The voiceprint authentication unit 16 compares the speech received by the speech receiving unit 14 with the terminal 20 in the locked state, and the voiceprint information stored in the voiceprint storage unit 28, to determine whether or not the user is legitimate (step B3).

The speech recognition unit 18 converts the speech received by the speech receiving unit 14 with the terminal 20 in the locked state, to text data by speech recognition (step B4).

The execution unit 22 executes an application stored in the application storage unit 32 using the text data obtained by the speech recognition unit 18. In a case of determining, by the voiceprint authentication unit 16, that the user is legitimate (Yes in step B5), the execution unit 22 executes an application using the text data, while allowing access (that is, normal mode) to protected information held by the terminal 20. For example, in a case where the application is an Internet search application based on speech recognition, the execution unit 22 performs an Internet search using the text data and outputs result(s) of the Internet search to the display unit 26.

Next, the execution unit 22 extracts an application associated with the text data obtained by the speech recognition unit 18 from the application storage unit 32, to be displayed as a list on the display unit 26 of the terminal 20 (step B7).

For example, when the text data includes a keyword (application name, telephone, camera, mail, player, etc.) that represents an application, a keyword (geographical name, telephone number, mail address, musical composition name, etc.) that represents data used by an application, or a keyword (start of a telephone call, photographing, mail transmission, reproduction, etc.) that represents an operation of an application, the execution unit 22 extracts applications associated with these keywords as a list of candidates to be started up, and displays the list on the display unit 26.

From the above, execution result(s) (step B6) of applications associated with content vocally inputted by the user and the list (step B7) of the applications in question are displayed on the display unit 26 of the terminal 20. When the user selects a desired application by a touch operation from the list of applications displayed on the display unit 26, the touch panel unit 24 receives this (step B8).

Next, the execution unit 22 starts up the application selected by the user (step B9).

On the other hand, in a case where the voiceprint authentication unit 16 does not determine that the user is legitimate (No in step B5), the execution unit 22 executes an application using the text data, while forbidding access (that is, restricted mode) to protected information held by the terminal 20 (step B10). It is to be noted that in a case where an application cannot be executed without using protected information stored in the terminal 20, when it is not determined by voiceprint authentication that the user is legitimate, the execution unit 22 need not execute (or start up) an application.

When performing the voiceprint authentication (step B3), a fixed amount of voice information is necessary. Therefore, where information for voiceprint authentication is lacking in step B3, unit may be provided in the terminal 20 that recommends to the user the input of additional voice information. According to the terminal in question, it is possible to improve the accuracy of the voiceprint authentication. When there is no additional speech input, the terminal 20 may be operated in a mode (restricted mode) the same as the case where the voiceprint authentication does not match.

With regard to the speech uttered while the user is pushing a prescribed button (for example, a software key on the screen) voiceprint authentication only may be used, without using speech recognition.

According to the terminal 20 of the present exemplary embodiment, unlocking is performed by the user only speaking to the authentication screen (lock screen), without unlocking the terminal by a finger, and it is possible to obtain result(s) of an Internet voice search and of voice commands or the like. According to the terminal 20, since it is possible to perform authentication regarding whether the user is legitimate by voiceprint authentication, it is possible to prevent fraudulent use of the terminal.

In terminals in related technology, normally if user authentication is not completed, it is completely impossible to use the functions of the terminal. According to such terminals, in a case where authentication based on voiceprint fails, keywords for performing speech input search or keywords for speech recognition conversation, inputted by a user by speech, are discarded.

However, according to the terminal 20 of the present exemplary embodiment, even in a case where it could not be determined that the user is legitimate, by voiceprint authentication (No in step B5), text data extracted from inputted speech is used in applications (for example, Internet search). Therefore, it is possible to prevent voice information inputted by a user being discarded and wasted when voiceprint authentication fails, and it is possible to dispense with the need for the user to repeat a speech utterance of the same content.

Third Exemplary Embodiment

A description is given concerning a terminal according to a third exemplary embodiment, making reference to the drawings. FIG. 5 is a block diagram showing an example of a configuration of the terminal according to the present exemplary embodiment. Referring to FIG. 5, the terminal 30 is provided with a sensor unit 34, instead of a power activation unit 12 as in the terminal 20 (FIG. 3) according to the second exemplary embodiment.

The sensor unit 34 is a sensor that measures a prescribed physical amount (for example, acceleration, temperature, static electricity, or the like). In the present exemplary embodiment, in a case where the physical amount measured by the sensor unit 34 is a prescribed value, speech receiving unit 14 begins receiving speech in a locked state.

In the terminal 20 (FIG. 3) according to the second exemplary embodiment, speech reception by the speech receiving unit 14 is started with activation of power supply by an operation on a power button or the like, as a trigger.

On the other hand, in the present exemplary embodiment, speech reception by the speech receiving unit 14 is started with measurement by the sensor unit 34 as a trigger. An accelerometer or a gyro sensor, for example, may be used as the sensor unit 34, to detect shaking of the terminal 20. A sensor that detects heat or static electricity on a surface of the terminal 20 may also be used. By providing these sensors, it is possible to recognize that a user has touched the sensor 20, and to start speech reception by the speech receiving unit 14.

According to the present exemplary embodiment, by only a user lifting up the terminal 20 and speaking to the terminal 20 as it is, for example, the terminal is unlocked, and it is possible to obtain result(s) of executing an application based on a speech recognition function. Since speech reception is not started until the prescribed physical amount is measured by the sensor 34, it is possible to reduce power when in standby.

Fourth Exemplary Embodiment

A description is given concerning a terminal according to a fourth exemplary embodiment, making reference to the drawings. FIG. 5 is a block diagram showing an example of a configuration of the terminal 30 according to the present exemplary embodiment.

In the present exemplary embodiment, as the state of the terminal 30, a sensor unit 34 detects orientation (for example, vertical, horizontal, inclined), or a connection state of the terminal 30 with respect to peripheral equipment, or the like. As an example of the state of the terminal 30, the sensor unit 34 detects a state where the terminal is held in a vertical orientation in the hand of the user, a state where the terminal is held in a horizontal orientation in the hand of the user, a state where the terminal is arranged on a charging stand (cradle), a state where the terminal is arranged in a car cradle (that is, a cradle attached to the car dashboard or similar), or the like.

The terminal 30 of the present exemplary embodiment operates, for example, as follows. In a case where the terminal 30 is vertically positioned, operations may be the same as in the third exemplary embodiment.

On the other hand, in a case where the sensor unit 34 detects that the terminal 30 is placed in a car cradle, speech receiving unit 14 continuously performs a speech receiving operation. In a case where it is determined by speech recognition unit 18 that the inputted speech is that of the owner, execution unit 22 executes an application using the text data obtained by the speech recognition. At this time, the execution unit 22 may start up a car navigation application associated with driving a car, a map application, an application providing traffic information, or the like, and may display the result(s) of an information search with a browser.

In a case where it is determined by the sensor unit 34 that the terminal 30 is placed in a charging cradle, the execution unit 22 may display a clock application, a movie display, or the result(s) of an information search with a browser.

In addition, in a case where the sensor unit 34 detects that the terminal 30 is being held in a horizontal orientation by the user, the execution unit 22 may extract a television application, a camera application, or the like, and may display an icon for starting up these applications at the top of a list display.

According to the terminal 30 of the present exemplary embodiment, it is possible to appropriately select an application to be executed using the result(s) of speech recognition in accordance with the state in which the terminal is positioned, and to display content as anticipated by a user, as an execution result of an application. According to the terminal 30, it is possible to display a list of icons of applications anticipated by the user. Therefore, according to the terminal 30 of the present exemplary embodiment, the user can obtain desired result(s) as application execution result(s), and furthermore, can easily start up a desired application.

First Example

Figure 6:
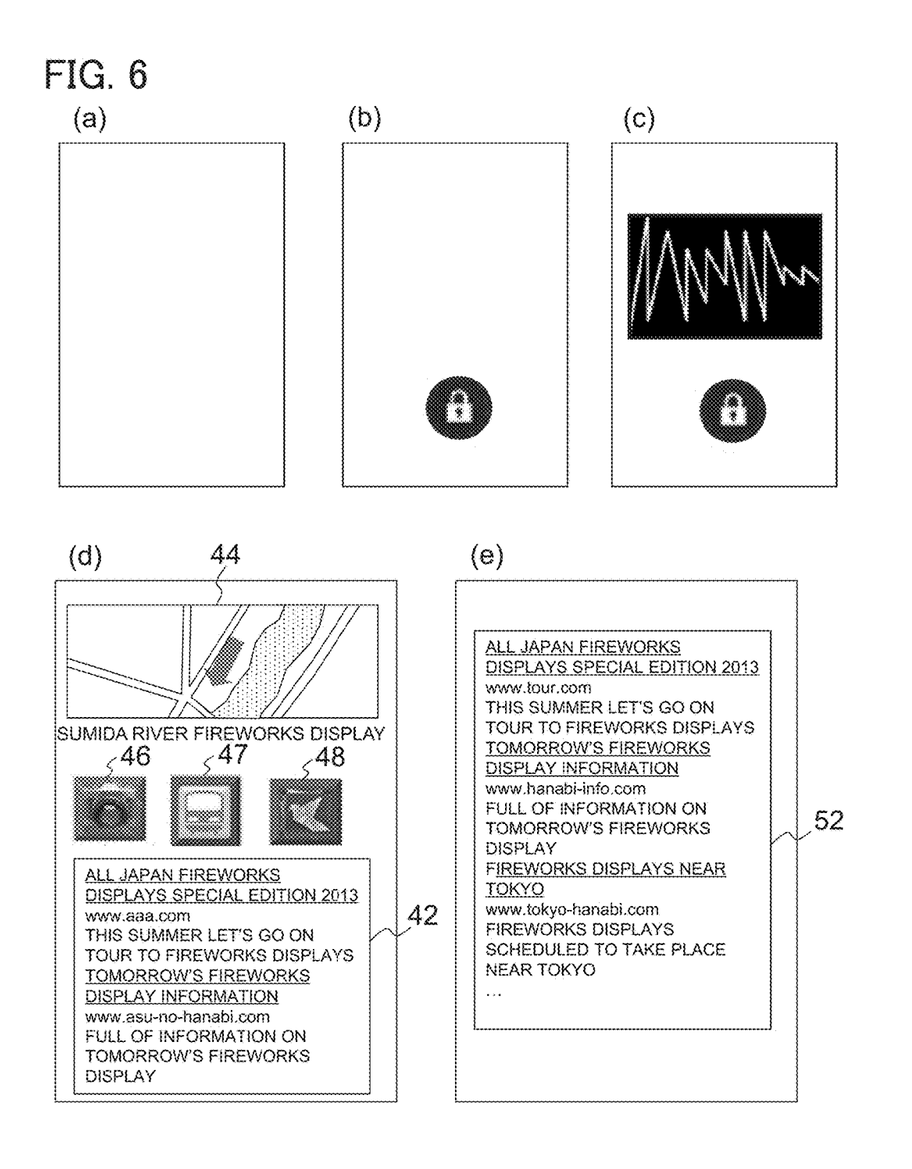
FIG. 6 is a diagram exemplifying operations of the terminal in an example.

Based on a first example, a specific description is given concerning operations of the terminal 20 (FIG. 3) according to the second exemplary embodiment. FIG. 6 shows an example of content displayed in the display unit 26 of the terminal 20 in the present example. The example assumes that an application using text data in which a user's speech is recognized is an Internet search application.

FIG. 6(a) shows display content before the user operates a power button. In this state, the speech receiving unit 14 of the terminal 20 is not receiving speech.

When a push operation of a hardware key or a power button is detected, the power activation unit 12 activates the power supply to the terminal 20 (step B1 in FIG. 4). Then the speech receiving unit 14 starts an operation of receiving speech with the terminal 20 in a locked state (step B2). FIG. 6(b) shows an example of a screen in a locked state.

When the speech receiving unit 14 receives speech, the voiceprint authentication unit 16 performs voiceprint authentication based on the speech received in the locked state (step B3). The speech recognition unit 18 converts the speech received in the locked state to text data by speech recognition. FIG. 6(c) shows a situation where the voiceprint authentication unit 16 and the speech recognition unit 18 are operating.

As shown in FIG. 6(a) to (c), when a hardware key is operated, for example, the terminal 20 starts speech reception in a locked state, and performs voiceprint authentication and speech recognition. Therefore, the user need not expressly make an utterance in order to perform unlocking, and may utter a keyword to be searched by an Internet search, directed to the terminal 20 in the locked state. In the following, as an example, content uttered by the user is "Venue for tomorrow's Sumida River fireworks display."

The voiceprint authentication unit 16 compares the voiceprint of speech uttered by the user and the voiceprint of the legitimate user as recorded in the voiceprint storage unit 28, and determines whether or not the user is legitimate (step B3).

The speech recognition unit 18 performs speech recognition of speech uttered by the user, and converts it to "Venue for tomorrow's Sumida River fireworks display" (step B4).

In a case of determining, by voiceprint authentication by the speech recognition unit 18, that the person who spoke is the legitimate user of the terminal 20 (Yes in step B5), the execution unit 22 performs an Internet search using the keywords of "Venue for tomorrow's Sumida River fireworks display," while allowing access to protected information (for example, cookie information) stored in the terminal 20, and outputs a search result to the display unit 26. The lower part of FIG. 6(d) shows Internet search result(s) 42 according to the keywords in question.

Furthermore, the execution unit 22 extracts applications related to words included in the text data of "Venue for tomorrow's Sumida River fireworks display," and displays icons for starting up the extracted applications on the display unit 26 (step B7). It is to be noted that in a case where an application related to words included in the text data is clear, the execution unit may execute an application using the text data, and show execution result(s) on the display unit 26.

In the upper part of FIG. 6(*d*), a result 44 is displayed, where a map application, which is an application related to the keyword "venue," is executed with the keywords of "Venue for tomorrow's Sumida River fireworks display." Furthermore, in the middle part of FIG. 6(*b*), as applications related to words included in the text data of "Venue for tomorrow's Sumida River fireworks display," an icon 46 for starting up a camera application, an icon 47 for starting up a public transport transfer information application, and an icon 48 for starting up a social media application are displayed.

On the other hand, in a case where it is not determined by voiceprint authentication by the speech recognition unit 18 that the user of the terminal 20 is legitimate (No in step B5), the terminal 20 starts operations in a restricted mode (for example, guest mode). In the case of the restricted mode, the execution unit 22 performs only Internet search, and does not read identification number or protected information that is stored in the terminal 20. At this time, a browser does not disclose any information of the terminal 20, and operates in a mode (secret mode) that discards cookie information. The execution unit 22 performs an Internet search with text data obtained by speech recognition: "Venue for tomorrow's Sumida River fireworks display" as keywords (step B10), obtains search result(s) as a list, and displays the list on the display unit 26. FIG. 6(*e*) shows result(s) 52 of the Internet search at this time. Thereafter, the execution unit 22 performs browsing in a secure mode browser.

According to the present exemplary embodiment, by uttering keyword(s) for an Internet search to a terminal in a locked state, the user of the terminal 20 can unlock the terminal and obtain Internet search result(s).

Second Example

Based on a second example, a specific description is given concerning operations of the terminal 20 (FIG. 3) according to the second exemplary embodiment. The present example assumes an application using text data in which a user's voice is recognized to be a telephone calling application. In the following, a description is given concerning differences from the first example.

In the present example, a user utters the telephone number of another party, for example, to the terminal 20 that is in a locked state. Here, as an example, the content uttered by the user is assumed to be "01234567890."

The speech recognition unit 18 performs speech recognition of speech uttered by the user, and converts it to "01234567890" (step B4).

In a case of determining, by voiceprint authentication by the speech recognition unit 18, that the person who spoke is the legitimate user of the terminal 20 (Yes in step B5), the execution unit 22 makes a call to the other party's telephone number "01234567890," using a telephone number assigned to the terminal 20, for example, as protected information that is stored in the terminal 20. In this way, a voice call with the other party is possible.

On the other hand, in a case where it is not determined by voiceprint authentication by the speech recognition unit 18 that the user of the terminal 20 is legitimate (No in step B5), the terminal 20 starts operations in a restricted mode (for example, a guest mode). In the case of the restricted mode, the execution unit 22 cannot read information (for example, the telephone number assigned to the terminal 20) stored in the terminal 20, and waits for call processing to be performed.

According to the present example, by only uttering the telephone number of the other party to the terminal that is in a locked state, the user of the terminal 20 can unlock the terminal and can start a voice call with the other party.

It is to be noted that the various disclosures of the abovementioned Patent Literature are incorporated herein by reference thereto. Modifications and adjustments of exemplary embodiments and examples may be made within the bounds of the entire disclosure (including the scope of the claims) of the present invention, and also based on fundamental technological concepts thereof. Furthermore, various combinations and selections of various disclosed elements (including respective elements of the respective claims, respective elements of the respective exemplary embodiments and examples, respective elements of the respective drawings, and the like) are possible within the scope of the claims of the present invention. That is, the present invention clearly includes every type of transformation and modification that a person skilled in the art can realize according to the entire disclosure including the scope of the claims and to technological concepts thereof. In particular, with regard to numerical ranges described herein, arbitrary numerical values and small ranges included in the relevant ranges should be interpreted to be specifically described even where there is no particular description thereof.

It is to be noted that the following modes are possible in the present invention.

(First Mode)
A terminal may be the terminal according to the first aspect described above.

(Second Mode)
The terminal may comprise a power activation unit that activates a power supply to the terminal if a prescribed operation is detected, wherein the speech receiving unit may start receiving speech in the locked state if the power supply to the terminal is activated in response to the prescribed operation.

(Third Mode)
The terminal may comprise a sensor unit that measures a prescribed physical amount, wherein the speech receiving unit may start receiving speech in the locked state if the physical amount measured by the sensor unit is a prescribed value.

(Fourth Mode)
In the terminal, the execution unit may execute the application using the result of the speech recognition while allowing access to protected information stored in the terminal if the voiceprint authentication determined that the user is legitimate.

(Fifth Mode)
In the terminal, the execution unit may execute the application using the result of the speech recognition, while forbidding access to protected information stored in the terminal if the voiceprint authentication does not determine that the user is legitimate.

(Sixth Mode)
In the terminal, the execution unit may extract an application(s) related to word(s) included in the result of the speech recognition and display a list of the extracted application(s) on a screen of the terminal if the voiceprint authentication determines that the user is legitimate.

(Seventh Mode)
In the terminal, the execution unit may extract an application(s) according to orientation of the terminal or type of a peripheral device to which the terminal is connected and display a list of the extracted application(s) on a screen of the terminal if the voiceprint authentication determines that the user is legitimate.
(Eighth Mode)
An unlocking method may be the unlocking method according to the second aspect described above.
(Ninth Mode)
The unlocking method may comprise: by the terminal, activating a power supply to the terminal if a prescribed operation is detected by the terminal, wherein speech reception in the locked state is started if a power supply to the terminal is activated in response to the prescribed operation.
(Tenth Mode)
The unlocking method may comprise: by the terminal, measuring a prescribed physical amount by the terminal, wherein speech reception in the locked state is started if the measured physical amount is a prescribed value.
(Eleventh Mode)
In the unlocking method, the terminal may execute the application using the result of the speech recognition while allowing access to protected information stored in the terminal if the voiceprint authentication determines that a user is legitimate.
(Twelfth Mode)
In the unlocking method, the terminal may execute the application using the result of the speech recognition while forbidding access to protected information stored in the terminal if the voiceprint authentication does not determine that the user is legitimate.
(Thirteenth Mode)
The unlocking method may comprise: by the terminal, extracting an application(s) related to word(s) included in the result of the speech recognition if the voiceprint authentication determines that the user is legitimate; and displaying a list of the extracted application(s) on a screen of the terminal.
(Fourteenth Mode)
The unlocking method may comprise: by the terminal, extracting an application(s) according to orientation of the terminal, or type of a peripheral device to which the terminal is connected if the voiceprint authentication determines that the user is legitimate; and displaying a list of the extracted application(s) on a screen of the terminal.
(Fifteenth Mode)
A program may be the program according to the third aspect described above.
(Sixteenth Mode)
The program may cause the computer to execute: activating a power supply to the terminal if a prescribed operation is detected; and starting speech reception in the locked state if the power supply to the terminal is activated in response to the prescribed operation.
(Seventeenth Mode)
The program may cause the computer to execute: measuring a prescribed physical amount; and starting speech reception in the locked state if the measured physical amount is a prescribed value.
(Eighteenth Mode)
The program may cause the computer to execute: executing the application using the result of the speech recognition, while allowing access to protected information stored in the terminal if the voiceprint authentication determines that the user is legitimate.
(Nineteenth Mode)
The program may cause the computer to execute: executing the application using the result of the speech recognition while forbidding access to protected information stored in the terminal if the voiceprint authentication does not determine that the user is legitimate.
(Twentieth Mode)
The program may cause the computer to execute: extracting an application(s) related to word(s) included in the result of the speech recognition if the voiceprint authentication determines that the user is legitimate; and displaying a list of the extracted application(s) on a screen of the terminal.
(Twenty-First Mode)
The program may cause the computer to execute: extracting an application(s) according to orientation of the terminal, or type of a peripheral device to which the terminal is connected if the voiceprint authentication determines that the user is legitimate; and displaying a list of the extracted application(s) on a screen of the terminal.

10, 20, 30 terminal
12 power activation unit
14 speech receiving unit
16 voiceprint authentication unit
18 speech recognition unit
22 execution unit
24 touch panel unit
26 display unit
28 voiceprint storage unit
32 application storage unit
34 sensor unit
42, 44, 52 result(s)
46-48 icon

The invention claimed is:
1. A terminal, comprising:
hardware, including a processor and memory; a speech receiving unit implemented at least by the hardware and that receives speech in a locked state;
a voiceprint authentication unit implemented at least by the hardware and that performs voiceprint authentication based on the speech received in the locked state and determining whether or not a user is legitimate;
a speech recognition unit implemented at least by the hardware and that performs speech recognition of the speech received in the locked state; and
an execution unit implemented at least by the hardware and that, if the voiceprint authentication determined that the user is legitimate, executes an application using the result of the speech recognition while allowing access to protected information stored in the terminal, and if the voiceprint authentication does not determine that the user is legitimate, executes without requesting the user for additional information the application using the result of the speech recognition of the speech, for which the voiceprint authentication has failed, and provides the user with a result of execution of the application while forbidding access to the protected information stored in the terminal, wherein
the execution unit extracts one or more applications according to orientation of the terminal, or type of a peripheral device to which the terminal is connected if the voiceprint authentication determines that the user is legitimate; and
displays a list of the one or more extracted applications on a screen of the terminal.

2. The terminal according to claim 1, comprising:
a power activation unit implemented at least by the hardware that activates a power supply to the terminal if a prescribed operation is detected, wherein
the speech receiving unit starts receiving speech in the locked state if the power supply to the terminal is activated in response to the prescribed operation.

3. The terminal according to claim 1, comprising:
a sensor unit implemented at least by the hardware that measures a prescribed physical amount, wherein
the speech receiving unit starts receiving speech in the locked state if the physical amount measured by the sensor unit is a prescribed value.

4. The terminal according to claim 1, wherein the execution unit extracts an application(s) related to word(s) included in the result of the speech recognition and displays a list of the extracted application(s) on a screen of the terminal if the voiceprint authentication determines that the user is legitimate.

5. The terminal according to claim 1, wherein
the execution unit extracts an application(s) according to orientation of the terminal or type of a peripheral device to which the terminal is connected and displays a list of the extracted application(s) on a screen of the terminal if the voiceprint authentication determines that the user is legitimate.

6. An unlocking method, comprising:
by a terminal, receiving speech in a locked state;
performing voiceprint authentication based on the speech received in the locked state and determining whether or not a user is legitimate;
performing speech recognition of the speech received in the locked state;
if the voiceprint authentication determined that the user is legitimate, executes an application using the result of the speech recognition while allowing access to protected information stored in the terminal, and if the voiceprint authentication does not determine that the user is legitimate, executing without requesting the user for additional information, by the terminal, the application using the result of the speech recognition of the speed, for which the voiceprint authentication has failed, and provides the user with a result of execution of the application while forbidding access to protected information stored in the terminal;
by the terminal, extracting one or more applications according to orientation of the terminal, or type of a peripheral device to which the terminal is connected if the voiceprint authentication determines that the user is legitimate; and
displaying a list of the one or more extracted applications on a screen of the terminal.

7. A non-transitory computer-readable recording medium, storing a program that causes a computer provided in a terminal to execute:
receiving speech in a locked state;
performing voiceprint authentication based on the speech received in the locked state and determining whether or not a user is legitimate;
performing speech recognition of the speech received in the locked state; and
if the voiceprint authentication determined that the user is legitimate, executes an application using the result of the speech recognition while allowing access to protected information stored in the terminal, and if the voiceprint authentication does not determine that the user is legitimate, executing without requesting the user for additional information the application using the result of the speech recognition of the speech, for which the voiceprint authentication has failed, and provides the user with a result of execution of the application while forbidding access to protected information store in the terminal;
extracting one or more applications according to orientation of the terminal, or type of a peripheral device to which the terminal is connected if the voiceprint authentication determines that the user is legitimate; and
displaying a list of the one or more applications on a screen of the terminal.

8. The non-transitory computer-readable recording medium according to claim 7, wherein
the program causes the computer to execute:
activating a power supply to the terminal if a prescribed operation is detected; and
starting speech reception in the locked state if the power supply to the terminal is activated in response to the prescribed operation.

9. The non-transitory computer-readable recording medium according to claim 7, wherein
the program causes the computer to execute:
measuring a prescribed physical amount; and
starting speech reception in the locked state if the measured physical amount is a prescribed value.

10. The non-transitory computer-readable recording medium according to claim 7, wherein
the program causing the computer to execute:
executing the application using the result of the speech recognition, while allowing access to protected information stored in the terminal if the voiceprint authentication determines that the user is legitimate.

11. The non-transitory computer-readable recording medium according to claim 7, wherein
the program causes the computer to execute:
extracting an application(s) related to word(s) included in the result of the speech recognition if the voiceprint authentication determines that the user is legitimate; and
displaying a list of the extracted application(s) on a screen of the terminal.

12. The non-transitory computer-readable recording medium according to claim 7, wherein
the program causes the computer to execute:
extracting an application(s) according to orientation of the terminal, or type of a peripheral device to which the terminal is connected if the voiceprint authentication determines that the user is legitimate; and
displaying a list of the extracted application(s) on a screen of the terminal.

* * * * *